United States Patent [19]
Leas et al.

[11] 3,751,906
[45] Aug. 14, 1973

[54] POLLUTION CONTROLLER

[75] Inventors: Lawrence E. Leas, Simi, Calif.;
Robert L. Leas; Cecil J. Johnson,
both of Columbia City, Ind.

[73] Assignee: Leas Brothers Development Corporation, Columbia City, Ind.

[22] Filed: Feb. 22, 1972

[21] Appl. No.: 227,768

Related U.S. Application Data

[63] Continuation-in-part of Ser. No. 2,450, Feb. 11, 1970, abandoned.

[52] U.S. Cl............. 60/39.02, 23/277 R, 23/284, 60/39.18 B, 423/213, 431/5, 431/6, 431/7
[51] Int. Cl............. F02c 7/30, F23c 9/02
[58] Field of Search.............. 60/39.02, 39.06, 60/39.18 B, 295, 298, 280; 423/212, 213; 23/277 R, 288 F, 284; 431/6, 7, 5

[56] References Cited
UNITED STATES PATENTS

| 1,720,757 | 7/1929 | Blanchard | 431/7 |
| 2,624,172 | 1/1953 | Houdry | 60/39.52 |
| 3,632,296 | 3/1953 | Houdry | 60/39.52 |
| 2,970,434 | 2/1961 | Warren | 60/39.18 B |
| 3,206,414 | 9/1965 | Gunther | 423/213 |

Primary Examiner—Douglas Hart
Attorney—John J. Byrne et al.

[57] ABSTRACT

A method for decreasing or eliminating exhaust emissions of nitrogen oxides, unburned hydrocarbons, carbon monoxides, or the like. The combustion temperature is maintained at a sufficiently low level to prevent the formation of nitrogen oxides. The exhaust gases are reacted with a metal oxide for the removal of contaminants, unburned hydrocarbons and carbon monoxide.

5 Claims, 1 Drawing Figure

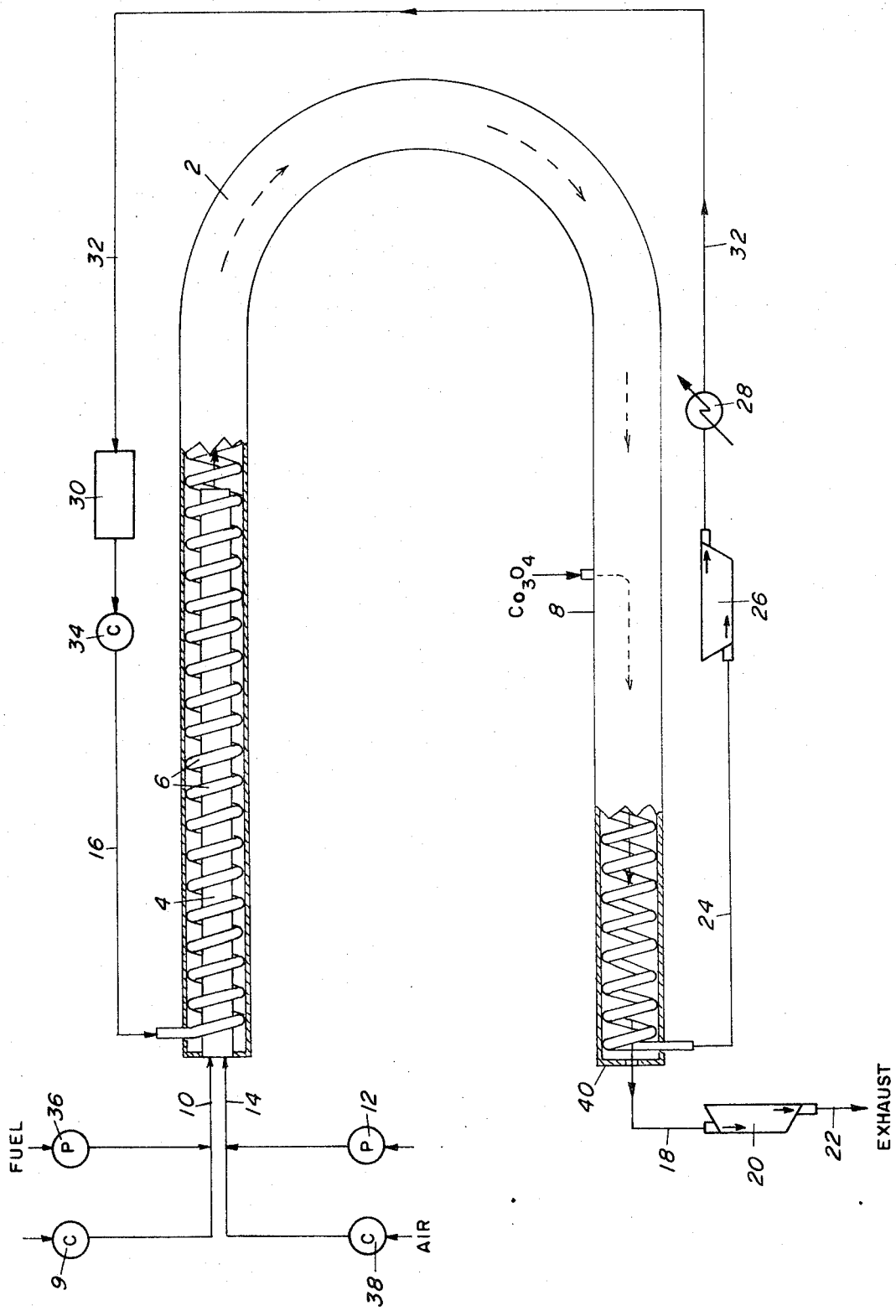

POLLUTION CONTROLLER

This is a continuation-in-part application of my application Ser. No. 2,450, filed Feb. 11, 1970, entitled POLLUTION CONTROLLER, now abandoned.

The present invention relates to a method and system for decreasing or eliminating emission contaminants caused by burning hydrocarbon fuels with air. More specifically, fuel is burned with air (excess air or excess fuel) in a pressure combustor containing cooling coils with a Rankine fluid flowing through the coils, to lower the peak combustion temperature thus decreasing the nitric-oxide production. The products of combustion, along with any unburned fuel and carbon monoxide are passed to a packed bed of the higher metal oxide such as cobalt oxide ($Co_3O_4$), and oxidized with air to the higher oxide on the previous combustion sequence. The higher metal oxide reacts with the hydrocarbons and carbon monoxide to produce water vapor and carbon dioxide. The latter products are vented to the atmosphere via a lower recovery system. In most cases some sulfur will be present. The metal oxide will remove the sulfur dioxide at the lower temperatures (such as at start-up) and it will release these sulfur dioxides at the higher temperatures. Therefore, the sulfur dioxide that causes corrosion whenever the environmental temperatures are below the condensing point of water, is contained, and cannot mix with condensed water and thus the corrosion problems are alleviated. Since the sulfur present in the fuel is fairly low, the sulfur releases at the higher temperatures is sufficiently low so as to cause no operating difficulty. This amount of air pollution from this source is no more of a problem than from present day engines. Thus, the corrosion and catalytic poisoning problems with sulfur dioxide within the catalytic treater and muffler are eliminated.

While it is known in the prior art that a decrease in the combustion temperature will cause a decrease in nitric oxides, the decrease in nitric oxides usually cause increases in the hydrocarbons and carbon monoxide emissions in the exhaust. This is very true if excess fuel is used to decrease the combustion temperature. Other methods such as recycling part of the exhaust gases, etc., have been used but still the exhaust emissions are above the acceptable levels. However, in the present invention, both cooling fluid through coils within the combustor and excess fuel can be used to decrease the nitric oxides while the unreacted hydrocarbons and carbon monoxide will be removed downstream by chemical reactions with the higher metal oxide. In addition, the reactions removing the hydrocarbons and carbon monoxide are exothermic so that this heat is recovered as power in passing through the gas turbine prior to exhausting to the atmosphere. Therefore, the overall specific fuel consumption is not increased as compared to present day configurations that eliminate some of the pollutants from the exhaust. In the present invention the pollutants of nitric oxides, carbon monoxide, and hydrocarbons are reduced or eliminated as well as the oxides of sulfur at the lower temperatures which cause most of the corrosion in the mufflers, etc.

In general terms, the present invention removes or decreases the exhaust emissions of nitric oxides, unburned hydrocarbons, carbon monoxide at all the temperature levels of operations and removes the sulfur oxides at the lower levels of temperature to alleviate corrosion problems.

More specifically, the present invention facilitates the removal or lessening of contaminants emitted to the atmosphere caused by burning hydrocarbon fuels, with emphasis on unburned hydrocarbons, carbon monoxide, and oxides of nitrogen. In addition, oxides of sulfur are removed at the lower temperatures such as start-up, warm-up, etc., wherein corrosion by sulfur dioxide and condensed water is minimized. The present invention as shown is more applicable to pressure combustion systems wherein the gases are expanded through a gas turbine prior to exhaust, but is applicable also to present day commercial engines by utilizing a heat exchanger to either vaporize the fuel prior to injection or to preheat the air. If used in a pressure combustor system, both the gas turbine and the Rankine fluid turbine can be used as power producers.

An objective of the present invention is to provide pollution control for large and small industrial engines. The system is applicable to electricity generating plants using a hydrocarbon fuel for generation of electricity.

Another objective of the present invention is to provide pollution control for mobile vehicles using either external or internal combustion engines.

Another objective of the present invention is to decrease the corrosion caused by sulfur dioxide and condensed water prevalent at lower temperatures in systems using hydrocarbon, sulfur containing fuels.

Another objective of the present invention is to provide a system of decreasing nitric oxide emissions by maintaining the combustion temperature at lower levels wherein nitric oxides form by removing some of the combustion heat with a cooling fluid flowing through coils located inside the combustion chamber and/or by the use of excess fuel. The hydrocarbons and carbon monoxide are removed (reacted to water and carbon dioxide) in a higher metal oxide bed. The generated heat is removed as power or process heat as required.

Another objective of the present invention is to reduce pollutants by utilizing cobalt oxides in a packed bed for reaction with the hydrocarbons and carbon monoxide.

Another objective of the present invention is to use at least two oxide beds when possible, so that one bed is reduced and the other bed is being oxidized with air.

Another objective of the present invention is to oxidize the bed on mobile applications by injection with excess air during the course of operation using present day instrumentation.

Another objective of the present invention is to oxidize the bed upon shut off of the fuel by instrumentation so that air is injected into the bed after the fuel is shut off.

Another objective of the present invention is to utilize the heat removed by the vaporized Rankine fluid in a Rankine expander for power recovery or as process heat.

Another objective of the present invention is to recover the heat from the gas stream by either power recovery in a gas turbine or in a heat exchanger as required.

Another objective of the present invention is to combine the power recovered in the two recovery turbines for increased efficiency.

These and other objects of the present invention will become more apparent to those skilled in the art by reference to the following detailed description when viewed in light of the accompanying drawing wherein:

The FIGURE is a schematic of the preferred system.

Referring now to the drawing, the combustor unit is designated as 2. The unit has a lining 4 inside the burning area with tubes 6 between the inside wall and the outside tube lining. The tubes are coiled the whole length of the combustor unit, including the metal oxide reagent section 8. Fuel enters the combustor via line 10 from pump 9 along with compressed air from compressor 12 and line 14. Burning takes place inside the front end of the combustor in the area of the lining 4. Water or other Rankine fluids flow through the coils 6 and enter via line 16 to keep the combustor temperature below the limit of high nitrogen oxide formation. The gases from the combustion flow through the U-tube and any unreacted hydrocarbons or carbon monoxide is reacted to water and carbon dioxide via the higher metal oxide 8, preferably cobalt oxide. The exhaust gases exit via line 18, through turbine 20 and are exhausted through line 22. The vaporized Rankine fluid leaves the combustor coils via line 24, is expanded in another turbine 26, and then is condensed in air condenser 28. The condensed liquid is returned to tank 30 via line 32 and is recycled back to line 16 via pump 34. Start-up fuel pump 36 and start-up air compressor 38 are electrically operated and receive their energy from a battery (not shown). After the shaft is rotating by the steam and gas turbines, the start-up pump and compressor are taken over by the main pump and compressor, respectively. A high temperature perforated filter, 40, is used to contain the metal oxide. The cooling fluid in the combustion section prevents the high temperatures normally associated with hydrocarbon combustion. The temperature of the combustion products is controlled within the range of 2,000°–2,700°F, thus, decreasing the formation of nitrogen oxide compounds, one of the present day air pollutants from the internal combustion engine. The gases are further cooled in the U-tube section to within the range of 1,500°–1,800°F, depending upon the limits of the gas turbine materials. Any carbon monoxide and/or unburned hydrocarbons are reacted to carbon dioxide and water vapor within the cobalt oxide bed. The combustor can be operated either fuel or air rich. If the operation is fuel rich, the reduced cobalt oxide must be regenerated after fuel flow is stopped and this can be accomplished by instrumentation that upon stopping, the start-up air compressor will run for a short period of time to regenerate the reduced cobalt oxide bed back to the higher oxide. In stationary operation wherein continuous operation is maintained, two or more cobalt oxide beds are used so that regeneration occurs in one bed while reaction of carbon monoxide and/or hydrocarbons takes place in the other bed. Although an U-shape unit is shown in the drawing, it is to be understood that other configurations can be used such as a total straight unit, more curves, etc., without detracting from the scope of the invention. The unit configuration can be adapted to its end use. The cobalt oxide bed could contain other metal oxides or metal oxides impregnated on inert carriers without detracting from the scope of the present invention. The unit can be operated either under pressure or at atmospheric pressure.

Further, the system of this invention is not limited to a particular combustor but can be used with existing internal combustion engines, either of the type employed in automobiles or those in industrial applications.

If the combustor is operated with excess air, a series of chemical reactions could take place in the cobalt oxide reactor which would decrease the exhaust emissions of carbon monoxide and unburned hydrocarbons. The following reactions are possible:

1. $Co_3O_4 + CO \rightarrow 3CoO + CO_2$
2. $(m + 2n)Co_3O_4 + C_nH_m \rightarrow nCO_2 + m/2\ H_2O + 3(m + 2n)\ CoO$
3. $3CoO + \frac{1}{2}O_2 \rightarrow Co_3O_4$
4. $CO + \frac{1}{2}O_2 \rightarrow CO_2$
5. $C_nH_m + (n + m/4)O_2 \rightarrow nCO_2 + m/2H_2O$ Reactions 1–3 would involve reducing the higher cobalt oxide to the lower oxide and then oxidizing it back to the higher oxide with the excess oxygen in the exhaust stream. In reactions 4 and 5, the cobalt oxide acts as a catalyst and provides an active site for the carbon monoxide and unburned hydrocarbons to be oxidized with the excess oxygen to carbon dioxide and water vapor. It is immaterial as to what reactions take place since the exit gas stream contains exhaust emissions below that of what is generally the norm for internal combustion engines, and below that for projected goals set by the Environmental Protection Act. The above reactions are exothermic and the cooling coils are used to control the temperature. Any localized hot spots are eliminated since the gas flow removes the heat as it is formed.

In addition to decreasing the exhaust emissions of carbon monoxide and unburned hydrocarbons, nitric oxide removal is possible as shown below:

$$NO + 3CoO \rightarrow Co_3O_4 + \tfrac{1}{2}N_2$$

The above reaction has a very large equilibrium constant so that the reaction is highly feasible. In addition the carbon monoxide could react with the nitric oxide on the cobalt surface in which case the cobalt oxide serves as a catalyst. This reaction is as follows:

$$CO + NO \rightarrow CO_2 + \tfrac{1}{2}N_2$$

This reaction also has a very large equilibrium constant and is also feasible from a thermodynamic viewpoint. The formation of nitrogen dioxide ($NO_2$) by the following reactions is neglible since the equilibrium constants are very small in comparison to the equilibrium constant of the reducing reactions of nitric oxide (NO) to nitrogen. Both of the following reactions have very low equilibrium constants at the operating temperature of the present invention.

$$NO + \tfrac{1}{2}O_2 \rightarrow NO_2$$

$$NO + Co_3O_4 \rightarrow 3CoO + NO_2$$

Therefore, the present invention decreases the nitric oxide emissions without increasing the nitrogen dioxide levels whether by chemical reaction involving cobalt oxide or whether the metal oxide serves as a catalyst.

The operation of the method of this invention will be more fully understood with reference to the following examples:

EXAMPLE 1

Methane and air were burned at 300 PSIA., in an external combustor with water flowing through the cooling coils. The equivalence ratio of methane/air was 1.1 (fuel rich). The higher oxide of cobalt ($Co_3O_4$) was placed after the combustion gases inside the pressure vessel and the temperature of the gases to the oxide was 1,500°F. This was due to more cooling of the gases by the water-steam as shown in the drawing. The gases out of the system was 1,520°F., with the following analysis: Nitrogen-oxides (measured as $NO_2$) — 20 ppm., Carbon Monoxide — 19 ppm and Hydrocarbons of 17 ppm. Calculations of the power available from both the steam and gas by expanding through their respective turbines assuming 90 percent mechanical efficiency gave a thermal efficiency of 36.1 percent. The above conditions were made without the metal oxide present and the exhaust analysis was nitrogen oxides measured as $NO_2$ (28) ppm., hydrocarbons 0.52 vol. percent and carbon monoxide 1.11 percent.

EXAMPLE 2

N-Octane and air were preheated to 400°F., and injected into the combustor of Example 1 at an equivalence ratio of 0.82 (fuel lean). The operation was carried out at 260 PSIA., without cobalt oxide. The analysis of the pollutants of the exhaust gases were Nitrogen-Oxides (measured as $NO_2$) 503 ppm, Carbon monoxide — 824 ppm, and Hydrocarbons — 335 ppm. The exhaust gases exited at 2,600°F. No cooling fluid was used. Water was then turned on so that the water flowed through the coils to maintain the exhaust temperature out at 2,500°F. The nitrogen oxides were decreased to 314 ppm. Cobalt oxide was placed after the gases and the pollutants were decreased to: Nitrogen-oxides 105 ppm, Carbon monoxide — 42 ppm., and Hydrocarbons — 36 ppm. The thermal efficiency calculated as in the above example was 39.2 percent.

EXAMPLE 3

A fuel oil containing 2.3 percent by weight of sulfur was vaporized and injected into a combustor operating at 50 PSIA., along with stoichiometric air (equivalence ratio 1.0). Both fuel oil and air were preheated to 600°F. prior to injection into the combustor. The exit of the combustor contained the higher oxide of cobalt ($Co_3O_4$). The exhaust gas temperature was measured as well as the sulfur dioxide concentration immediately upon start-up and until steady state was reached. As long as the temperature was below 1,000°F., the sulfur dioxide concentration of the exhaust gas remained below 85 ppm., but then it increased so that no sulfur dioxide was removed above approximately 1,000°F. The exit gases contained low concentrations of other pollutants: $NO_2$ — 54 ppm., CO — 83 ppm., and Hydrocarbons — 28 ppm.

The cobalt oxide inside the combustion chamber was effective in decreasing contaminants of nitrogen oxides, hydrocarbons and carbon monoxide over a range of pressure of 15 to 2,500 psia., and temperatures from 300 to 2,500°F., and equivalence ratios of fuel and air of 0.1 to 4.0. The preferred range of operation is between 100 and 400 psia., 700 to 1,800°F and equivalence ratios of between 0.5 to 1.2. The cobalt oxide was effective in decreasing the sulfur dioxide concentration up to approximately 1,000°F, but beyond this temperature, it was not effective. Therefore, this mode of removal is very effective in decreasing the corrosion caused at temperatures wherever water can condense and mix with the sulfur dioxide.

In general manner, while there has been disclosed effective embodiments of the invention, it should be well understood that the invention is not limited to such embodiments as there might be changes made in the arrangement, disposition, and form of the parts without departing from the principle of the present invention as comprehended within the scope of the accompanying claims.

We claim:

1. A method for reducing or eliminating nitrogen oxide, unburned hydrocarbons and carbon monoxide from the exhaust gases of combustors comprising the steps of combusting fuel with air and removing part of the heat from the combustion chamber by circulating a cooling fluid through coils located within the combustor thereby lowering the peak combustion temperature and reducing the amount of nitrogen oxides produced, passing the exhaust gases through a bed of a multi-valent metal oxide in its higher form, reacting unburned hydrocarbons and carbon monoxide to water vapor and carbon dioxide, and regenerating the bed with air upon shut-off of the fuel.

2. The method of claim 1 wherein the corrosion caused by a mixture of condensed water and sulfur dioxide is minimized or eliminated upon start-up and at temperatures wherein water can condense by the oxide removing the sulfur dioxide from the exhaust gases so that a mixture of condensed water and sulfur dioxide cannot form.

3. The method of claim 1 wherein the multi-valent metal is cobalt.

4. The method of claim 1 wherein the cooling fluid is vaporized, passed through a vapor turbine for added power generation, condensed and recycled.

5. The method of claim 1 wherein the clean exhaust gases are expanded through a gas turbine for power generation.

* * * * *